UNITED STATES PATENT OFFICE.

JAMES WHITCOMB, OF HILLSDALE, MICHIGAN, ASSIGNOR OF ONE-FOURTH TO ELMO V. GARLOUGH AND ONE-FOURTH TO WILLIAM F. STEVENSON, BOTH OF HILLSDALE, MICHIGAN.

JOINT-PACKING COMPOSITION.

1,083,419. Specification of Letters Patent. Patented Jan. 6, 1914.

No Drawing. Application filed March 24, 1913. Serial No. 756,458.

*To all whom it may concern:*

Be it known that I, JAMES WHITCOMB, a citizen of the United States, and a resident of Hillsdale, in the county of Hillsdale and State of Michigan, have invented a certain new and useful Joint-Packing Composition; and I do hereby declare the following to be a full, clear, and exact description of the invention, such as will enable others skilled in the art to which it appertains to make and use the same.

This invention relates to a packing for all kinds of fluid line joints, such as gas, steam, air, water, gasolene, or the like, and has for its object to provide a highly efficient compound of this character which is of durable and lasting quality, simple and inexpensive to manufacture and capable of being easily and quickly applied.

In the carrying out of my invention, I preferably mix together the following ingredients in the quantities named, but it is to be understood that I do not restrict myself to the use of all of such ingredients or the exact quantities specified, as will be hereinafter more fully brought out:—Venetian red 1 pound, graphite 1 pound, lime ½ pound, petroleum (including any kind of machine oil) 1 quart, garlic extract 1 pint, shellac ⅓ pint. When these ingredients are thoroughly mixed they form a paste, the consistency of which depends, of course, upon the relative amounts of the dry and fluid ingredients that are mixed together. This paste is intended to be applied with a brush, or in any other suitable manner, to any suitable body material, which is preferably of a heavy fabric like nature, such, for instance, as canvas, ducking, burlap, or the like, and when the paste has dried thereon the whole may be cut into strips or sections of proper size, as the joints to be packed may require. It is found in practice that a packing prepared in this manner not only forms a very efficient fluid-tight joint, but is fireproof and will wear a long time and does not have any injurious effect or action on the packed parts.

The purpose of the Venetian red in the composition is to serve as a coloring matter and also as a binder, and while such ingredient is preferably used, other ingredients of a similar nature but of different colors may be employed, if desired. It will therefore be understood that the use of the term Venetian red as used in the claims is not to be restricted to the use of the particular material bearing that name but is used in a broader sense as applying to any material of a somewhat similar nature.

It is found in practice that the graphite can be omitted from the composition but it is preferable to use the same as a packing of better body and action is thereby provided.

The purpose of the lime in the composition is to lend toughness to it and also to render the same fireproof in its nature. The garlic acts as a drier in the composition and, while such ingredient is preferably used, other ingredients having a similar known action may be substituted therefor, if desired.

I wish it understood that my inveniton is not limited to the use of all of the ingredients named or to the proportions specified, except in so far as such limitations are specified in the claims.

Having thus described my invention, what I claim as new, and desire to secure by Letters Patent, is,—

1. A packing composition for packing pipe joints containing Venetian red, lime, petroleum, garlic and shellac.

2. A packing composition for packing pipe joints containing Venetian red 1 pound, lime ½ pound, petroleum 1 quart, garlic 1 pint, shellac ⅓ pint.

In testimony whereof, I have hereunto signed my name to this specification in the presence of two subscribing witnesses.

JAMES WHITCOMB.

Witnesses:
EDWIN J. SHEPARD,
ELMER P. SHEPARD.

---

Copies of this patent may be obtained for five cents each, by addressing the "Commissioner of Patents, Washington, D. C."